United States Patent [19]

Lenhart et al.

[11] Patent Number: 5,267,828
[45] Date of Patent: Dec. 7, 1993

[54] REMOVABLE FAN SHROUD PANEL

[75] Inventors: Kenneth J. Lenhart, Cincinnati; Brett R. Chouinard, Springdale; Frederick W. Tegarden, Glendale, all of Ohio

[73] Assignee: General Electric Company, Cincinnati, Ohio

[21] Appl. No.: 976,235

[22] Filed: Nov. 13, 1992

[51] Int. Cl.$^5$ .............................................. F01D 25/00
[52] U.S. Cl. .................... 415/9; 415/173.4; 415/196; 411/353
[58] Field of Search ............. 415/9, 128, 170.1, 173.1, 415/173.4, 174.4, 196, 197, 214.1; 411/352, 353, 970, 999

[56] References Cited

U.S. PATENT DOCUMENTS

| | | | |
|---|---|---|---|
| 2,737,222 | 3/1956 | Becker | 411/999 |
| 3,221,794 | 12/1965 | Acres | 411/353 |
| 3,843,278 | 10/1974 | Torell | 415/173.4 |
| 4,063,742 | 12/1977 | Watkins, Jr. | |
| 4,149,824 | 4/1979 | Adamson | 415/197 |
| 4,295,787 | 10/1981 | Lardellier | |
| 4,425,080 | 1/1984 | Stanton et al. | |
| 4,452,335 | 6/1984 | Mathews et al. | 415/119 |
| 4,534,698 | 8/1985 | Tomich | |
| 4,648,795 | 3/1987 | Lardellier | |
| 4,718,818 | 1/1988 | Premont | 415/197 |

FOREIGN PATENT DOCUMENTS 125200  4/1919  United Kingdom .

Primary Examiner—Edward K. Look
Assistant Examiner—James A. Larson
Attorney, Agent, or Firm—Jerome C. Squillaro

[57] ABSTRACT

A shroud panel is removably joinable inwardly of a fan casing and outwardly of a fan blade in a turbofan gas turbine engine. The panel includes an arcuate backing plate having a plurality of screws disposed therethrough for mounting the panel to the casing. Each of the screws includes a locking ring joined to the shank thereof and spaced from the screw head for allowing limited translation of the screw through the panel while preventing its liberation therefrom.

4 Claims, 5 Drawing Sheets

REMOVABLE FAN SHROUD PANEL

The present invention relates generally to gas turbine engines, and, more specifically, to an abradable fan shroud surrounding fan blades in a turbofan engine.

BACKGROUND OF THE INVENTION

High bypass turbofan gas turbine engines for powering an aircraft in flight include a fan disposed within a nacelle powered by a core engine for generating thrust to power the aircraft. The fan includes a plurality of circumferentially spaced apart fan blades having tips disposed closely adjacent to an annular shroud supported at the inner circumference of the fan nacelle. The shroud is typically formed of conventional abradable material so that occasional rubbing of the fan blade tips thereagainst does not damage the fan blades. However, such tip rubs increase the clearance between the blade tips and the remaining fan shroud which decreases fan efficiency and resulting performance of the engine.

Accordingly, the fan shroud must be repaired or replaced in order to return the fan and engine to optimum efficiency. In one conventional design, the abradable material of the fan shroud is permanently bonded to the inside surface of a fan casing, and, therefore, the refurbishment thereof requires removal of the old material, by machining for example, which is time consuming and costly. And, the engine must be typically removed from the aircraft wing, and the fan module disassembled therefrom in order to allow access to the fan shroud for its removal, which further complicates the refurbishment process.

In another conventional design, the abradable fan shroud is mechanically joined to the fan casing using nuts and bolts so that it is more readily removable for servicing. However, the use of fasteners such as nuts and bolts as compared to adhesives for joining the fan shroud to the fan casing introduces additional parts, the liberation thereof which must be prevented for preventing foreign object damage to the fan and engine.

More specifically, since a considerable number of mating nuts and bolts must be used to rigidly secure the fan shroud to the fan casing to prevent undesirable vibratory response thereof, for example, even the loss of one such nut or bolt during assembly or operation of the engine could lead to significant damage of the engine by its ingestion therein. A nut or bolt which is dropped and lost in the engine during assembly may find its way into the rotating components thereof and cause damage. Or, if a nut or bolt loosens during operation of the engine and is liberated into the engine it too may also cause damage to the engine.

Accordingly, nuts are typically captured by a nut plate fixedly joined in the fan casing which prevents their liberation when the mating bolt is not joined thereto. And, the bolt itself upon being joined to a respective nut may be locked thereto by conventional means including suitable adhesives, locking nuts, or locking wires. Such conventional locking arrangements, however, do not prevent the loss of a bolt, for example by being dropped by maintenance personnel during the assembly process.

SUMMARY OF THE INVENTION

A shroud panel is removably joinable inwardly of a fan casing and outwardly of a fan blade in a turbofan gas turbine engine. The panel includes an arcuate backing plate having a plurality of screws disposed therethrough for mounting the panel to the casing. Each of the screws includes a locking ring joined to the shank thereof and spaced from the screw head for allowing limiting translation of the screw through the panel while preventing its liberation therefrom.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
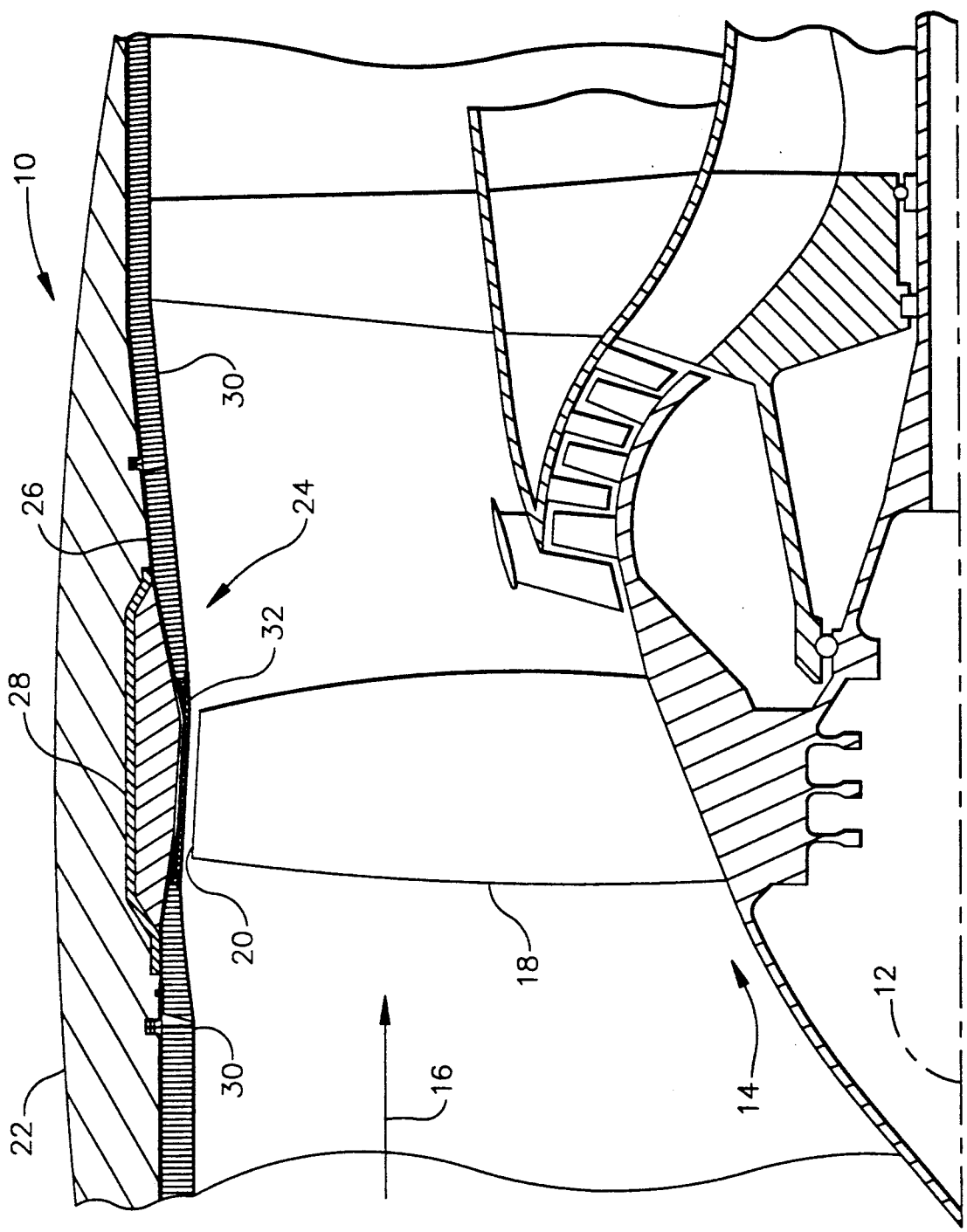
FIG. 1 is a schematic, longitudinal sectional view through a portion of a fan assembly of a turbofan gas turbine engine having a fan shroud in accordance with one embodiment of the present invention.

Illustrated schematically in FIG. 1 is a portion of a high bypass turbofan gas turbine engine 10 which may be mounted, for example, to a wing of an aircraft (not shown). The engine 10 has an axial, or longitudinal centerline axis 12 and a conventional fan 14 disposed coaxially therewith for receiving ambient air 16. The fan 14 includes a plurality of circumferentially spaced apart fan blades 18 each having a radially outer tip 20. Surrounding the fan 14 is a conventional nacelle 22 having an improved shroud panel assembly 24 in accordance with one embodiment of the present invention.

More specifically, disposed within the nacelle 22 is an annular fan casing 26 having a conventional fan containment structure 28 around its outer circumference disposed over the fan blade 18. The containment structure 28 may include, for example, conventional honeycomb and Keviar material for absorbing energy from fan blade fragments which may be ejected during an accident. Disposed radially inwardly of the fan casing 26 are conventional acoustic panels 30 both upstream and downstream of the fan blades 18 for reducing noise therefrom in a conventional manner.

Figure 6:
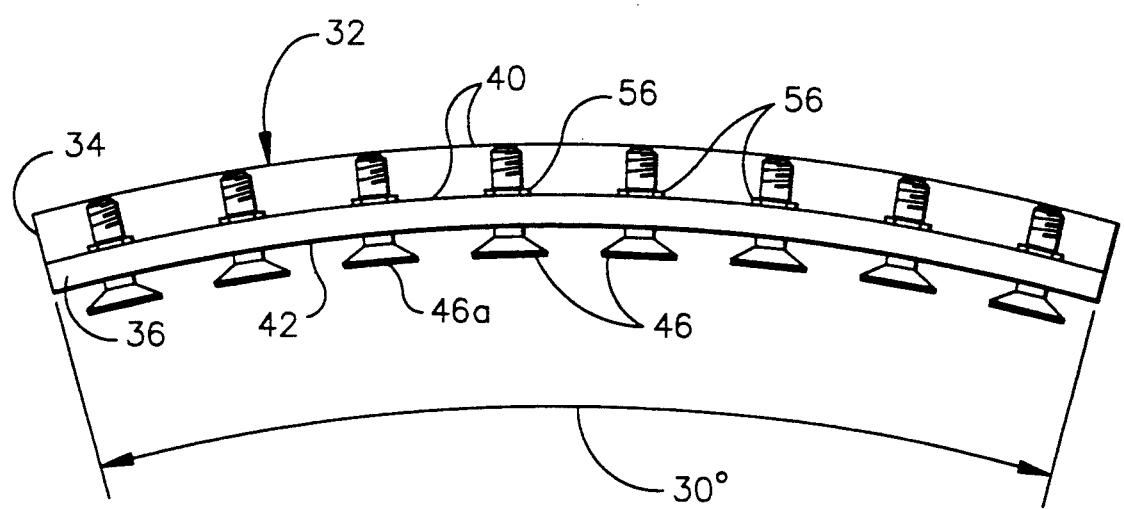
FIG. 6 is an aft facing view of the shroud panel illustrated in FIG. 4 and taken along line 6—6.

The shroud panel assembly 24 of the present invention includes a plurality of circumferentially adjoining, arcuate fan shroud panels 32 disposed about the centerline axis 12, which panels 32 are abradable for accommodating occasional rubbing therewith from the blade tips 20 without damage thereto. In the exemplary embodiment illustrated, twelve shroud panels 32 are used, with each extending over an arc of 30° as shown in FIG. 6.

Figure 2:
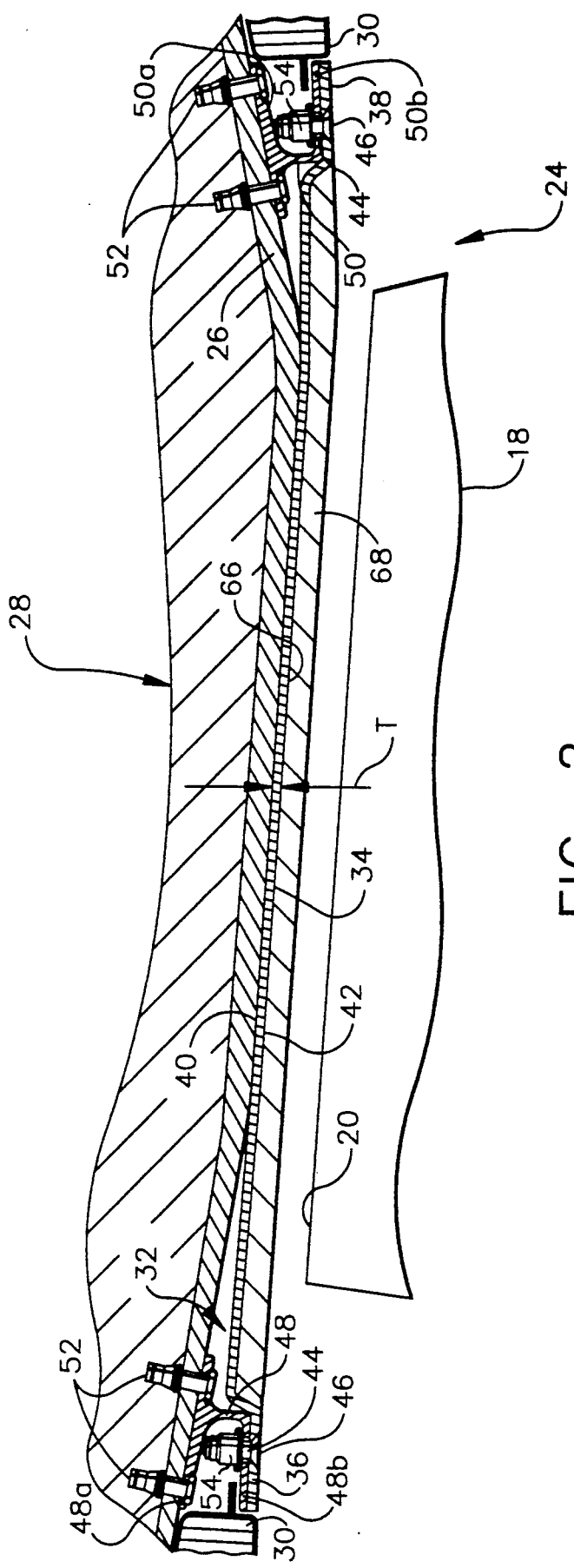
FIG. 2 is an enlarged, longitudinal sectional view of the fan shroud region surrounding the fan blades illustrated in FIG. 1 showing an exemplary shroud panel.

The shroud panel assembly 24 is illustrated in more particularity in FIG. 2 wherein each of the shroud panels 32 is removably joinable radially inwardly of, and to, the fan casing 26 and radially outwardly of the fan blade 18 in accordance with the present invention. Each panel 32 includes a backing plate 34 which is arcuate about the centerline axis 12 over an arc of about 30° (see FIG. 6) and includes axially spaced apart forward and aft opposite ends 36 and 38, respectively. The backing plate 34 also includes radially spaced apart radially outer and radially inner surfaces 40 and 42, respectively defining therebetween a panel thickness T. The panel outer surface 40 is outwardly convex, and the panel inner surface 42 is inwardly concave as better seen in FIG. 6.

Each of the panel ends 36, 38 has a plurality of circumferentially spaced apart mounting or panel apertures 44 extending from the outer surface 40 to the inner surface 42. A plurality of machine screws or bolts 46 are disposed through respective ones of the panel apertures 44 along the plate forward and aft ends 36, 38 for joining the panel 32 to the casing 26 by using a forward support ring 48 and an aft support ring 50 in this exemplary embodiment.

Figure 3:
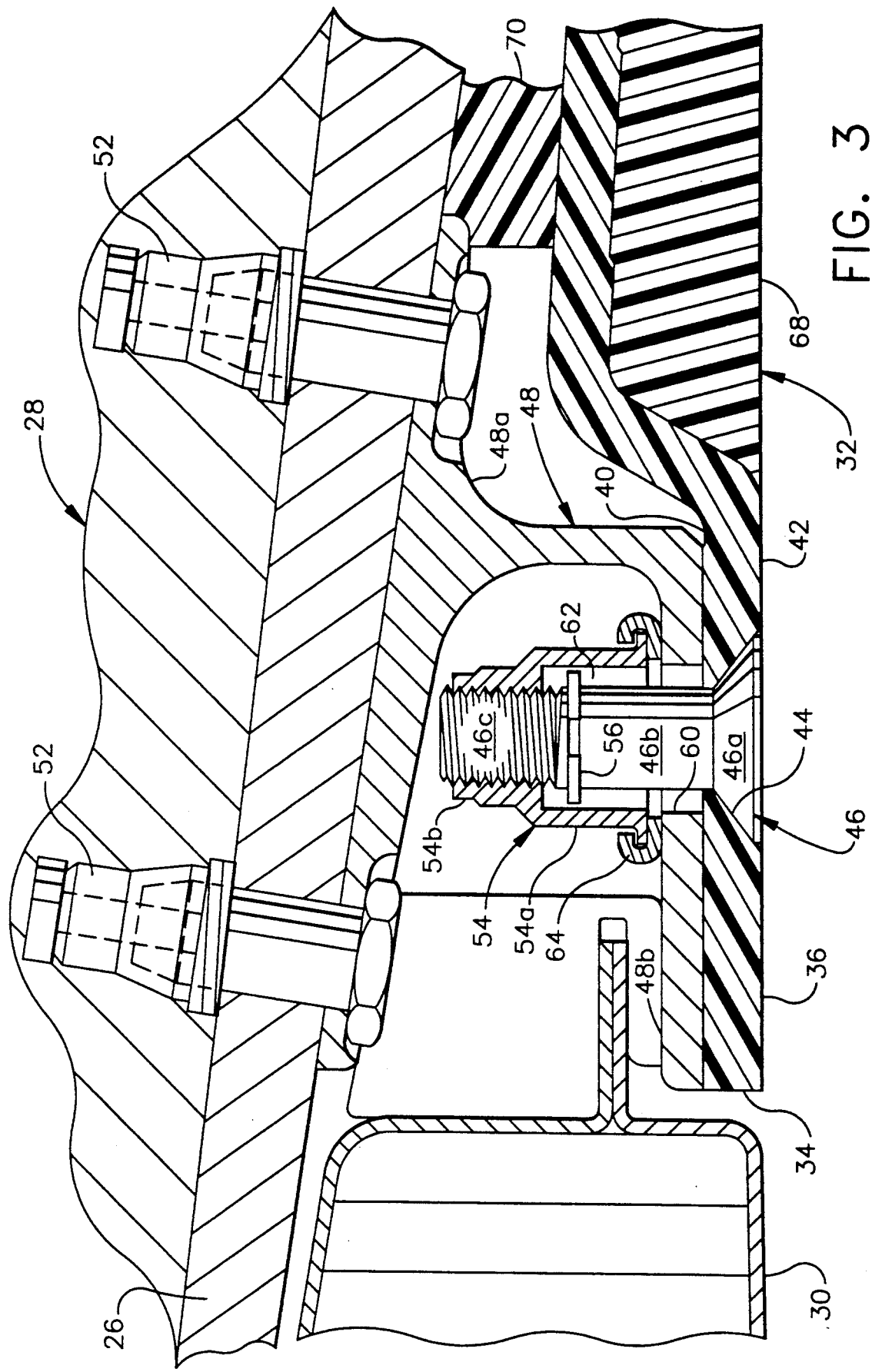
FIG. 3 is an enlarged longitudinal sectional view of the forward end of the shroud panel joined to the fan casing as illustrated in FIG. 2.
Figure 4:
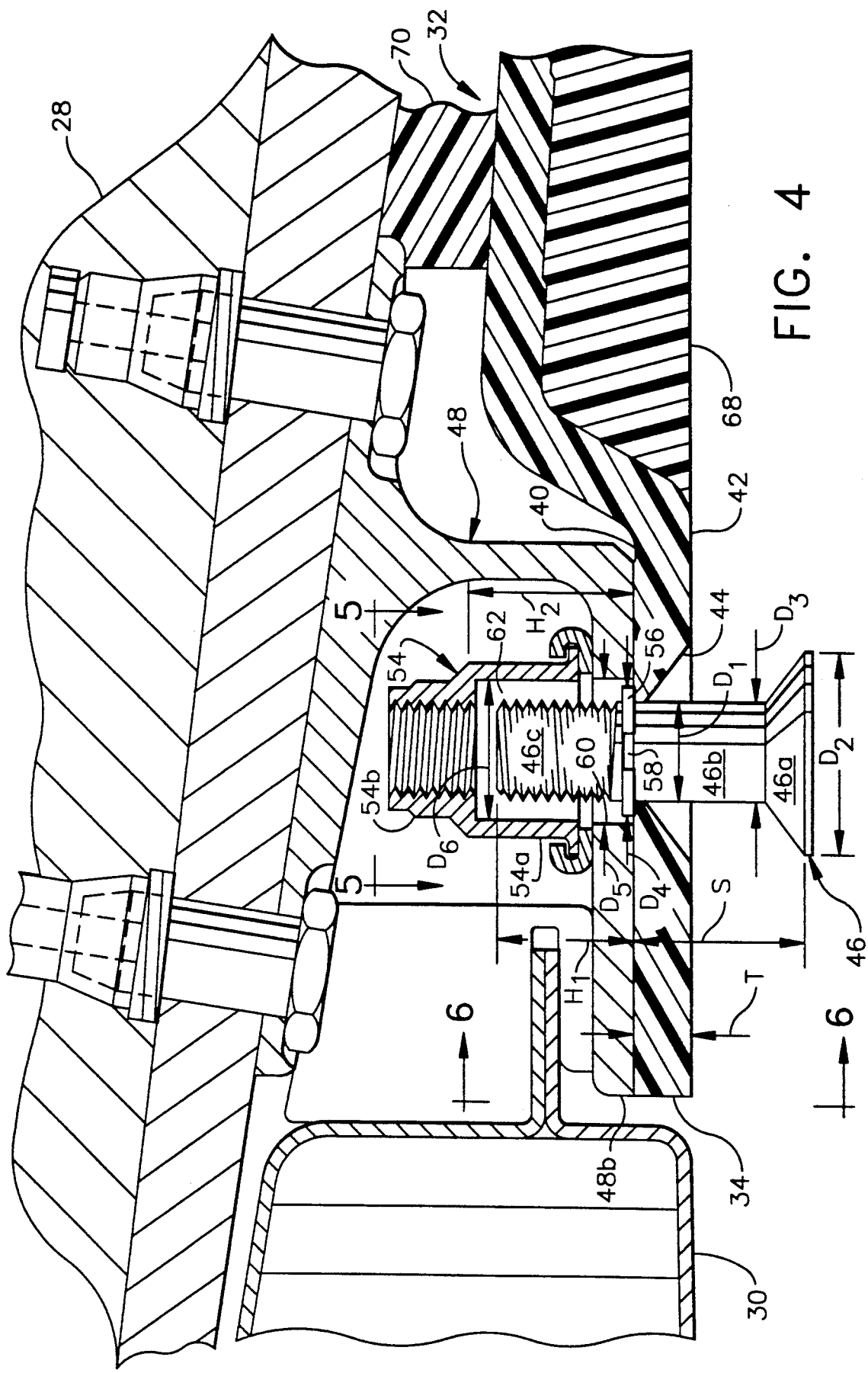
FIG. 4 is a longitudinal sectional view of the shroud panel joint with the fan casing similar to FIG. 3 and illustrating the disassembly of a panel screw from its mating captured nut.

FIGS. 3 and 4 illustrate in more particularity the joining of a shroud panel 32 to the fan casing 26 with the backing plate forward end 36 being joined to the forward support ring 48 by the screws 46, with it being understood that the plate aft end 38 is substantially identically joined to the casing 26 through the aft ring 50 and respective screws 46. Although the shroud panels 32 may be directly joined to the fan casing 26 in alternate embodiments, they are preferably joined to the support rings 48 and 50 which, rings 48 and 50 are in turn initially joined to the fan casing 26. As shown in FIGS. 3 and 4, the fan containment structure 28 surrounds the fan casing 26 and is disposed radially above the shroud panels 32 which prevents ready access to the outer circumference of the fan casing 26 during assembly or disassembly of the shroud panels 32 thereto.

Accordingly, each of the support rings 48, 50 has a general J-shape for both providing ready access thereto for removably mounting the shroud panel 32 thereto while also providing a suitable transition for joining the end of the acoustic panels 30 thereto as shown in FIG. 2. The forward ring 48 includes a proximal end 48a conventionally fixedly joined to the fan casing 26, by blind rivets or bolts 52, for example, and a distal end 48b spaced radially inwardly from the fan casing 26 for supporting the plate forward end 36. The aft ring 50 similarly includes a proximal end 50a conventionally fixedly joined to the fan casing 26 by more blind rivets 52 downstream from the forward ring 48, and also includes a distal end 50b spaced radially inwardly from the fan casing 26 for supporting the plate aft end 38. Also as shown in FIG. 2, respective pluralities of captured nuts 54 are disposed on the radially outer surfaces of the forward and aft ring distal ends 48b, 50b which receive respective ones of the screws 46 for mounting the panels 32 to the support rings 48, 50.

FIG. 3 illustrates an exemplary one of the panel screws 46 fully engaged with its respective nut 54 for rigidly clamping the panel forward end 36 to the forward ring distal end 48b. FIG. 4 illustrates the screw 46 unthreaded from the nut 54 which allows removal of the panel forward end 36 from the forward ring 48 without liberation of the screw 46 from the panel 32.

More specifically, and referring to FIG. 4, each screw 46 includes an enlarged head 46a disposed adjacent to the plate inner surface 42, with the head 46a being conical in this exemplary embodiment. The panel aperture 44 is complementary in configuration and includes a conical countersink for flushly receiving the screw head 46a as more clearly shown in FIG. 3. Each screw 46 further includes an integral shank 46b extending through the panel aperture 44, and also includes an integral threaded distal end 46c disposed adjacent the plate outer surface 40 for threadingly joining the panel 32 to the fan casing 26 by the nut 54.

As shown in FIG. 4, the conical panel aperture 44 has a minimum first diameter $D_1$, and the screw head 46a has a maximum outer, or second, diameter $D_2$ which is greater than the panel aperture diameter $D_1$. The screw shank 46b has an outer, or third, diameter $D_3$ which is less than the head diameter $D_2$ and slightly less than the panel aperture diameter $D_1$ for allowing the shank 46b to translate through the panel aperture 44. The screw threaded end 46c has an outer diameter which is generally equal to the shank diameter $D_3$.

In order to prevent the liberation or inadvertent loss of the screws 46 from the backing plate 34, either during assembly or disassembly servicing or during operation of the engine 10, an enlarged locking ring 56 is fixedly joined to each of the screw shanks 46b to prevent the screw 46 from being removed from the backing plate 34 once it is initially assembled thereto. However, the locking ring 56 must not interfere with assembly or disassembly of the panel 32 to the support rings 48, 50. Accordingly, the locking ring 56 is preferably spaced longitudinally from the screw head 46a at a longitudinal spacing S which is greater than the panel thickness T for allowing limited translation of the screw 46 through the panel aperture 44 as either the screw head 46a contacts the panel inner surface 42, e.g. the conical screw head 46a being seated in the conical panel aperture 44, or the locking ring 56 contacts the panel outer surface 40 which prevents disassembly of the screw 46 itself from the panel 32.

As shown in FIG. 4, the screw shank 46b preferably includes an annular groove or slot 58 therein, and the locking ring 56 is in the form of a conventional C-clip or split ring which is slidably captured in the shank groove 58 for preventing longitudinal movement thereof along the screw shank 46b. The locking ring 56 is sized greater than the panel aperture 44 for preventing its passage therethrough, with the locking ring 56 having an outer, or fourth, diameter $D_4$ being greater than the panel aperture diameter $D_1$. The inner diameter of the locking ring 56 is suitably less than the shank diameter $D_3$ within the shank groove 58 to prevent its unintended removal therefrom.

As shown in FIG. 4, the forward ring distal end 48b, and similarly the aft ring distal end 50b, includes an access aperture 60 having a fifth diameter $D_5$ for receiving therethrough the screw threaded end 46c and the locking ring 56 of the respective panel screws 46 without obstruction. Each of the nuts 54 includes a proximal end 54a conventionally fixedly joined to respective ones of the ring distal ends 48b, 50b and has a central bore 62 having a sixth diameter $D_6$ greater than the size of the locking ring 56, i.e. greater than the fourth diameter $D_4$, for allowing unobstructed translation of the locking ring 56 therein. Each of the nuts 54 further includes an internally threaded distal end 54b which threadingly receives a respective one of the panel screw threaded ends 46c as shown engaged in FIG. 3.

Figure 5:
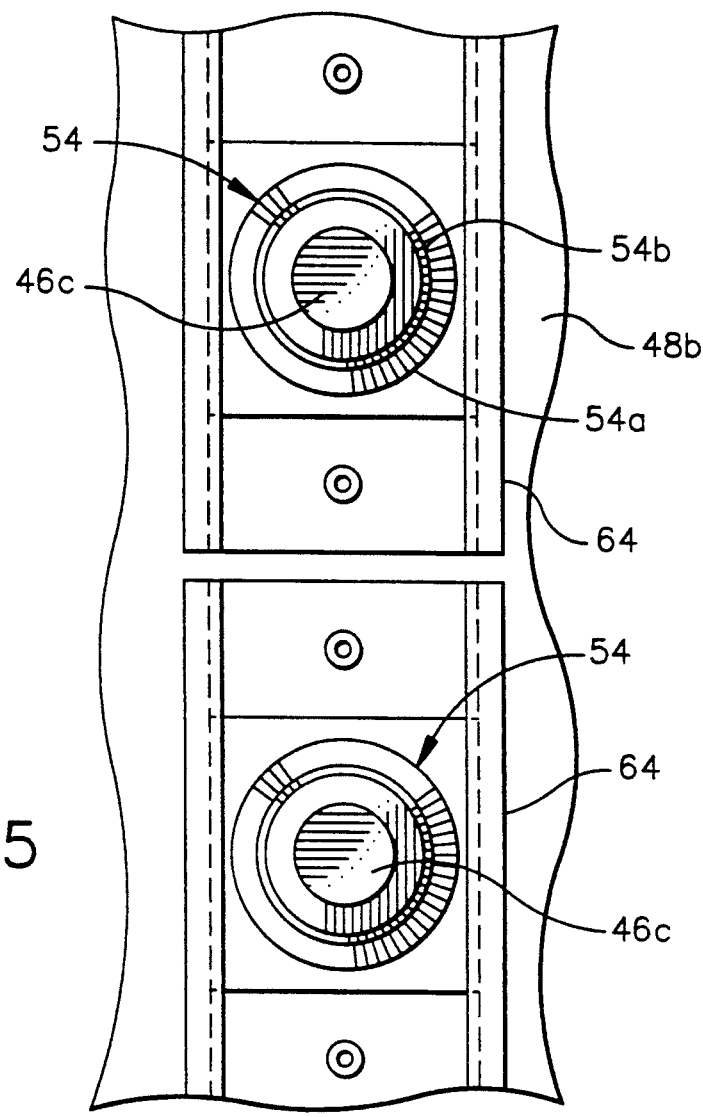
FIG. 5 is a top view of adjacent nuts illustrated in FIG. 4 and taken along line 5—5.

Each of the nuts 54 as shown in FIGS. 3 and 5, is conventionally joined to the forward ring distal end 48b, as well as the aft ring distal end 50b, by a conventional nut plate 64 which itself is conventionally riveted to the respective rings 48, 50. The nut plates 64 both prevent loss of the nuts 54 joined thereto and prevent their rotation for allowing the screws 46 to be threaded and tightened thereto.

Referring again to FIG. 4, the panel screw threaded end 46c has a suitable length so that its top is disposed at a first height $H_1$ from the bottom of the locking ring 56, and the bottom of the nut threaded distal end 54b is disposed at a second height $H_2$ from the panel outer surface 40 at the panel aperture 44. The second height $H_2$ is greater than the first height $H_1$ to allow the screw 46 to be fully unthreaded from the nut 54 which necessarily translates the screw 46 downwardly, with the locking ring 56 moving toward the panel outer surface 40. This allows the locking ring 56 adequate room to travel for fully withdrawing the screw threaded end 46c from the nut threaded end 54b without the locking ring 56 contacting the panel outer surface 40 prior to full disengagement of the threads to prevent binding.

FIG. 6 illustrates an exemplary one of the fan shroud panels 32 disassembled from the fan casing 26 with the several screws 46 hanging loosely in the backing plate forward end 36. The locking rings 56 on one side of the plate forward end 36, and the screw heads 46a on the other side of the plate forward end 36 prevent the screws 46 from being removed from the panels 32 unless the locking rings 56 are firstly removed. In this way, the screws 46 cannot be either lost during assembly or disassembly servicing operations or during actual operation of the engine 10 since the locking rings 56 retain them to the backing plate 34. To assemble the backing plate 34 to the support rings 48 and 50, the backing plate 34 is firstly positioned adjacent to the respective rings 48, as well as 50, as shown for example in FIG. 4, and then the screws 46 are engaged with the nut threaded ends 54b and threaded therein. For disassembly, the reverse procedure is effected with each screw 46 being unthreaded from the nut threaded end 54b until the screw threaded end 46c is removed from the nut threaded end 54b, with the locking ring 56 being translated downwardly until it rests free on top of the panel outer surface 40. Once all the screws 46 are removed from their respective nuts 54 at both ends of the shroud panel 32, the panel 32 may be removed from the fan 14 and replaced with a new shroud panel 32 without first requiring removal of all of the fan blades 18, which, therefore, allows on-wing servicing of the panels 32.

In the exemplary embodiment of the fan shroud panel 32 illustrated in FIG. 2, the backing plate 34 is configured to include or define a generally U-shaped recess 66 between the forward and aft ends 36, 38. The recess 66 includes a conventional abradable member 68 against which the fan blade tips 20 may occasionally rub during operation. The abradable member 68 may be a conventional composite material suitably adhesively bonded within the recess 66, and the backing plate 34 may also be a conventional composite structure for reducing weight. The abradable member 68 is, therefore, disposed axially between the forward and aft support rings 48, 50 with the panel screws 46 being threadingly joined to the fan casing 26 at the forward and aft support rings 48, 50 for removably mounting the shroud panel 32 thereto.

As shown in FIGS. 3 and 4, a suitable gasket 70 may be sandwiched between the radially outer surface of the panel 32 and the radially inner surface of the casing 26 for damping vibration of the panel 32 during engine operation.

The resulting shroud panel assembly 24 allows installation and replacement of individual fan shroud panels 32 with the engine 10 remaining on-wing without requiring complete disassembly of the fan 14 resulting in substantial savings in time and maintenance costs over current adhesively bonded shroud designs in commercial engines. And, the panel-captured screws 46 are prevented from being liberated from the panels 32, themselves, by the locking rings 56.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A shroud panel assembly comprising:
   an annular fan casing disposed radially outwardly of a fan blade in a turbofan gas turbine engine;
   a forward J-shaped support ring having a proximal end fixedly joined to said fan casing, and a distal end spaced radially inwardly from said fan casing;
   an aft J-shaped support ring having a proximal end fixedly joined to said fan casing downstream of said forward ring, and having a distal end spaced radially inwardly from said fan casing;
   a shroud panel removably joinable radially inwardly of, and to, said annular fan casing and radially outwardly of said fan blade comprising:
      an arcuate backing plate having axially spaced apart forward and aft opposite ends and radially spaced apart outer and inner surfaces defining a panel thickness therebetween, each of said plate ends having a plurality of circumferentially spaced apart panel apertures extending therethrough from said outer to inner surfaces;
      a plurality of screws disposed through respective ones of said panel apertures along said plate forward and aft ends, each screw including an enlarged head disposed adjacent said plate inner surface, an integral shank extending through said panel aperture, and an integral threaded distal end disposed adjacent said plate outer surface for threadingly joining said panel to said forward and aft support rings; and
      a plurality of enlarged locking rings each fixedly joined to a respective one of said screw shanks and sized greater than said panel aperture, said locking ring being spaced from said screw head at a longitudinal spacing greater than said panel thickness for allowing limited translation of said screw through said panel aperture as either said screw head contacts said panel inner surface or said locking ring contacts said panel outer surface for preventing disassembly of said screw from said panel;
   said distal ends of said forward and aft rings having access apertures receiving therethrough said threaded end and locking ring of respective panel screws;

a plurality of captured nuts disposed on radially outer surfaces of said forward and aft ring distal ends, each of said nuts including a proximal end fixedly joined to respective ones of said ring distal ends, and a central bore having a diameter greater than said locking ring for allowing unobstructed translation of said locking ring therein, each of said nuts further including a threaded distal end threadingly receiving a respective one of said panel screw threaded ends; and said panel screw threaded end being disposed at a first height from said locking ring, said nut threaded distal end being disposed at a second height from said panel outer surface at said panel aperture, and said second height being greater than said first height.

2. A shroud panel according to claim 1 wherein said screw shank includes an annular groove therein, and said locking ring is captured in said shank groove for preventing longitudinal movement thereof along said screw shank.

3. A shroud panel according to claim 2 in combination with said fan casing, and wherein:

said backing plate is configured to include a recess between said plate forward and aft ends, said recess including an abradable member against which said fan blade may rub; and said panel screws are threadingly joined to said fan casing for removably mounting said shroud panel thereto.

4. A shroud panel assembly according to claim 3 further comprising a gasket sandwiched between said radially outer surface of said panel backing plate and a radially inner surface of said fan casing for damping vibration of said panel during operation of said engine.

* * * * *